United States Patent [19]

Bayliss et al.

[11] Patent Number: 5,690,397
[45] Date of Patent: Nov. 25, 1997

[54] SOLENOID-OPERATED FLUID FLOW CONTROL VALVES

[75] Inventors: John Patrick Bayliss, Worcestershire; Ivan Mortimer, West Midlands, both of England

[73] Assignee: Lucas Industries Public Limited Company, England

[21] Appl. No.: 727,286

[22] Filed: Oct. 9, 1996

Related U.S. Application Data

[63] Continuation of Ser. No. 343,328, Nov. 21, 1994, abandoned.

[30] Foreign Application Priority Data

Nov. 27, 1993 [GB] United Kingdom ............... 9324408

[51] Int. Cl.⁶ ........................................ G60T 8/36
[52] U.S. Cl. ............................. 303/119.2; 303/117.1
[58] Field of Search ..................... 303/84.1, 115.2, 303/116.1, 117.1, 119.2; 137/596.17

[56] References Cited

U.S. PATENT DOCUMENTS

| | | | |
|---|---|---|---|
| 4,915,459 | 4/1990 | Hashida et al. | 303/117.1 |
| 5,234,265 | 8/1993 | Tyler | 303/118.1 |
| 5,248,191 | 9/1993 | Kondo et al. | 303/117.1 |
| 5,333,945 | 8/1994 | Volz et al. | 303/84.1 |
| 5,372,413 | 12/1994 | Broome et al. | 303/118.1 |
| 5,468,059 | 11/1995 | Farr | 303/117.1 |

Primary Examiner—Robert L. Oberleitner
Assistant Examiner—Chris Schwartz

[57] ABSTRACT

A solenoid-operated flow control valve is disclosed which comprises a housing having a bore, a solenoid coil, an armature, an inlet and an outlet, a permanent communication between an inlet and an outlet comprising a first and a second flow path connected in parallel between the inlet and the outlet, the first flow path being closable and the second flow path providing permanent communication between the outlet, an exhaust, a seating and a valve assembly including a hollow valve body working in the bore, the armature being responsive to the coil to open the exhaust to determine a pressure differential across the valve body, the pressure differential in turn causing the valve body to move in the bore so as to co-operate with the seating, whereby the valve body provides selective communication between the inlet, outlet and exhaust, and whereby upon deenergisation of the coil the flow control valve controls the rate of reapplication of pressure to the outlet.

17 Claims, 3 Drawing Sheets

SOLENOID-OPERATED FLUID FLOW CONTROL VALVES

This application is a continuation of application Ser. No. 08/343,328 filed Nov. 21, 1994, now abandoned.

This invention relates to improvements in solenoid-operated fluid-flow control valves. In particular, the invention is concerned with solenoid-operated flow control valves for use in hydraulic anti-lock braking systems for vehicles.

In known hydraulic anti-lock braking systems, a master cylinder is normally in communication with a brake via a flow control valve. The control valve comprises a hollow valve body with a flow control orifice working in a bore against a control spring to control communication between the master cylinder, the brake and an expander chamber. A pump is connected between the flow control valve and the master cylinder. An expander chamber, reservoir, dump or other low pressure source is present between the pump and the flow control valve. A normally-closed solenoid-operated valve is located between the reservoir and a spring control chamber housing the control spring.

In anti-lock braking, on detection of a skid signal, the solenoid-operated valve opens to connect the control spring chamber and the brake to the expander chamber. Fluid pressure from the brake is then released to the expander chamber. The pressure differential developed across the valve body moves it to isolate the master cylinder from the brake, and the pump is energised to pump fluid from the expander chamber to the master cylinder. Once the wheel recovers, the solenoid-operated valve is switched to isolate the brake from the expander chamber. The pumped fluid now reapplies the brake. The brake pressure is able to build until it matches the master cylinder pressure and the valve body returns to its normal operating position. However, in practice, when the solenoid-operated valve isolates the brake from the master cylinder, there is a sudden build up of pressure, or a pressure spike, in the control spring chamber. This causes the valve body to be forced back into its normal operating position, immediately re-connecting the master cylinder to the brake, and re-applying the brake. In such circumstances control of the brake on re-application is lost.

In summary, previous fluid-flow control valves in use in hydraulic braking systems have followed a three stage approach:

1. To isolate the master cylinder from the brake;
2. To open the brake to an expander chamber, reservoir, dump or some other low pressure source; and
3. To allow the valve body to move to a metering position to control the re-application of the brake.

While this approach works well, as described above it can lead to problems.

Also, in flow control valves in which the valve body comprises a spool, the spool comprising grooves and lands, with the grooves being connected to a central passage in the spool, the spool must be made to high manufacturing tolerances and with a high degree of accuracy.

According to a first aspect of the invention, in a solenoid-operated flow-control valve comprises a housing, a solenoid coil, an armature responsive to energisation of the coil to open an exhaust creating a pressure differential across a part of a valve assembly, the valve assembly comprises a hollow valve body working in a bore in the housing and co-operating with a seating, the valve body being responsive to the pressure differential to provide selective communication between an inlet, an outlet and the exhaust, wherein the inlet and the outlet are in permanent communication.

Conveniently the valve assembly comprises a sleeve, and the hollow valve body which works in the sleeve.

Two flow paths are provided between the inlet and the outlet. The first flow path is closable by the movement of the valve body, whereas the second flow path provides permanent restricted communication between the inlet and the outlet preferably through the valve body. Under normal operating conditions, the valve body is held in such a position so that communication between the inlet and the outlet is provided via both flow paths.

Our fluid-flow control valve is simple and cheap to produce. No high precision machining is required. With the inclusion of the housing, the majority of the components may be constructed of plastics material which, in turn, reduces the weight of a given assembly.

In operation, energisation of the solenoid coil moves the armature, placing the interior of the valve body in communication with the exhaust, and achieving a pressure differential across the valve body. This causes the valve body to engage with the seating on the sleeve, eliminating the flow from the inlet to the outlet through the first flow path. Energisation of the solenoid coil also places the outlet in communication with the exhaust via the interior of the valve body and passages in the valve assembly. When the flow-control valve is installed in a vehicle anti-lock hydraulic braking system, the inlet is connected to a master cylinder, the outlet is connected to the brake, and the exhaust is connected to an expander chamber. Normally free communication will be provided between the master cylinder and the brake, and the exhaust will be closed. In response to a skid signal the solenoid is energised to open the exhaust and upon movement of the flow-control valve body flow from the master cylinder to the brake via the first flow path is eliminated, with the brake being exhausted to the expander chamber. A motor is also energised which causes a pump to withdraw fluid from the expander chamber and pump it back to the master cylinder circuit and the inlet.

Upon correction of the skid, the solenoid is de-energised, the exhaust closed and fluid being pumped from the expander chamber is used to reapply the brake at a rate determined by flow through a fixed orifice and a variable orifice controlled by the pressure-sensitive member. Controlled reapplication of the brake is now possible, as the pressure spike developed on closure of the exhaust is dissipated through the larger combined volume of the brake and a control spring chamber in the valve body.

The pressure-sensitive member may comprise a rigid plate which is axially displaceable. A resilient member co-operating with the peripheral edge of the plate provides a seal between the plate and the sleeve as well as providing compliance when a differential is applied across the plate to allow sufficient displacement for it to seal against the seating on the valve body.

According to a second aspect of the invention, in a fluid-flow valve incorporating a pressure sensitive member across which a pressure differential is determined, a plate is provided in the flow-control valve having a flow control orifice to control maximum pressure rise rate across the pressure sensitive member during bleeding of the flow-control valve, for example during servicing when fluid is bled during bleeding of the brake lines upon changing the brake pads.

The maximum rise rate flow control orifice has little effect in the operation of the flow-control valve, but merely controls the build up of operating force across a pressure sensitive member. In a case where the pressure sensitive member comprises a diaphragm this can prevent damage to the diaphragm in the installation of the flow-control valve that would affect the subsequent operation of the flow-control valve.

An embodiment of the invention will now be described, by way of example only, in the following drawings, in which.

Figure 1:
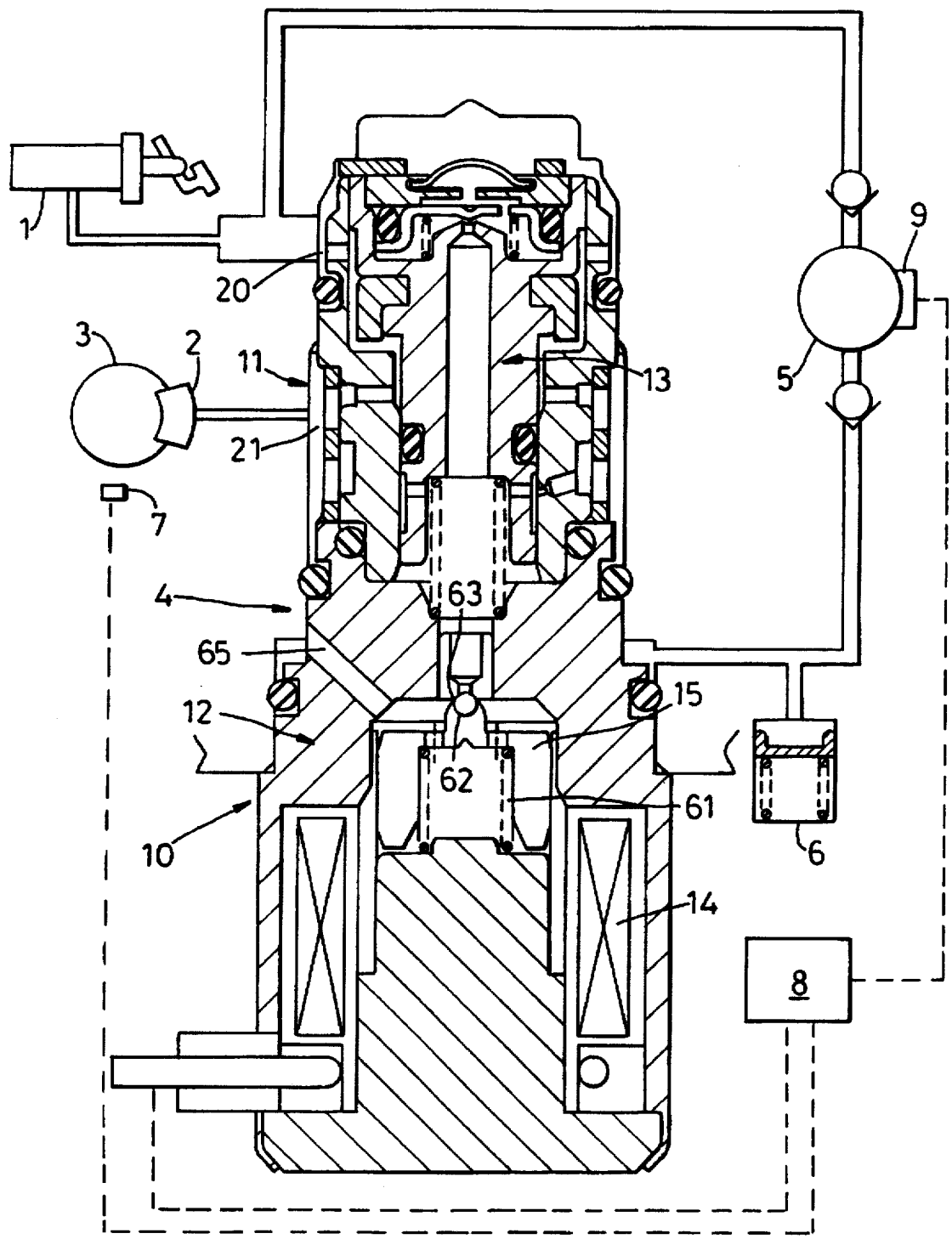
FIG. 1 shows a layout of an anti-lock hydraulic braking system for a vehicle.
Figure 2:
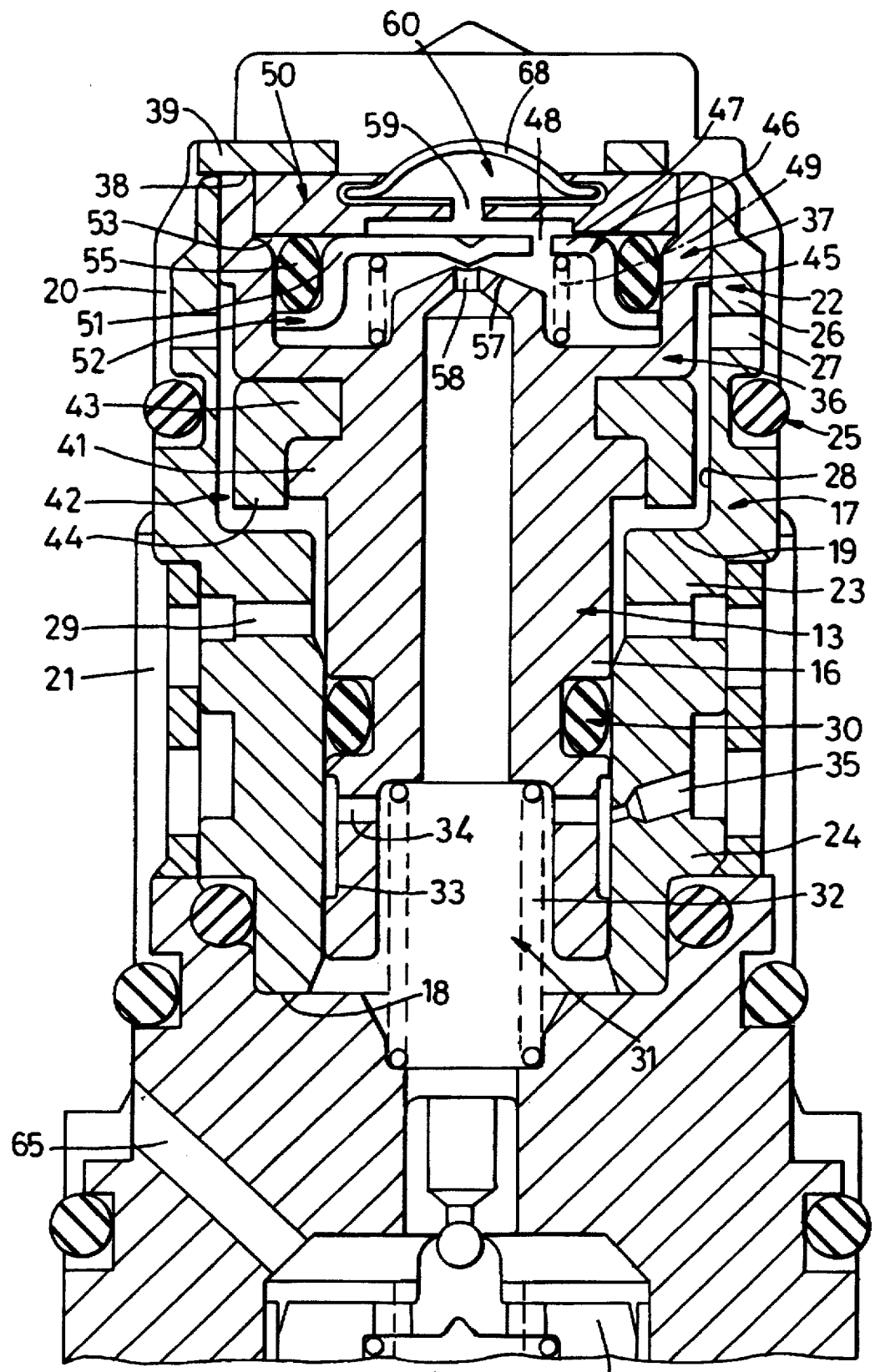
FIG. 2 shows a detail of FIG. 1 on an enlarged side.
Figure 3:
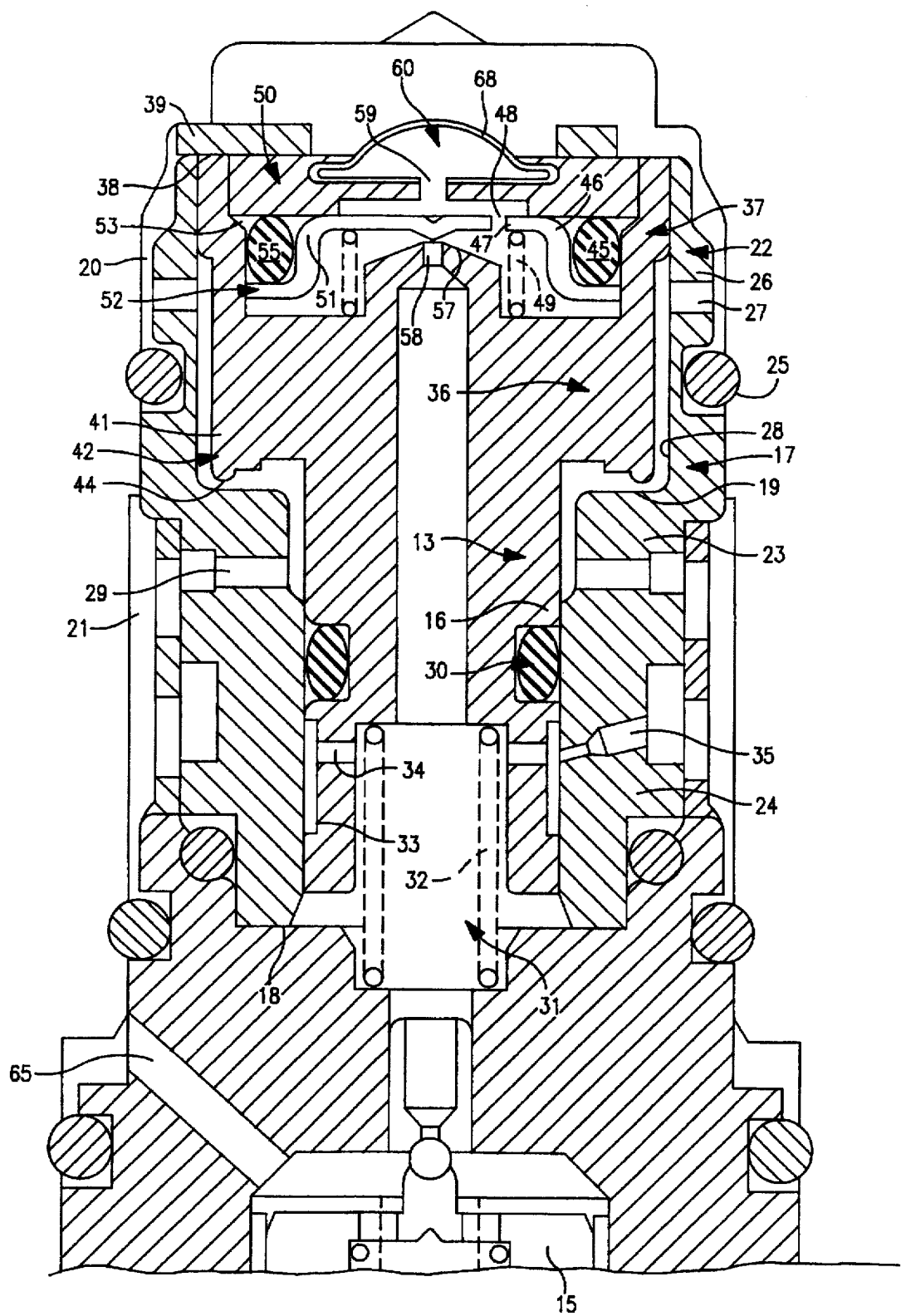
FIG. 3 shows an alternative detail of FIG. 1 which seal 42 is formed integrally with the valve body.

The anti-lock braking system illustrated in the layout of FIG. 1 comprises a pedal-operated master cylinder 1 for operating a brake 2 on a wheel 3 of a vehicle through a fluid-flow control valve 4. An electrically-operated pump 5 is adapted to withdraw hydraulic fluid from an expander chamber 6 and pump it into the master cylinder circuit in a manner to be described.

The speed of rotation of the wheel 3 is measured by a wheel speed sensor 7. Signals from the sensor 7 are received by an electronic control unit 8 which differentiates the signals and emits an energising current which is applied to the fluid flow-control valve 4 and to an electric motor 9 for driving the pump 5.

The fluid-flow control valve 4 comprises a housing 10. The housing 10 has first and second portions 11,12. The first portion 11 provides a housing for a valve assembly 13, and the second portion 12 provides a housing for a solenoid coil 14, and an armature 15.

The valve assembly 13 located in the housing comprises a valve body 16 which is hollow, and a sleeve 17. The hollow valve body 16 is axially moveable with respect to a seating 18 on the housing 10 and a seating 19 on the sleeve 17.

The first portion 11 of the housing 10 has an inlet 20 and an outlet 21.

The sleeve 17 is hollow and has a first portion 22 of greater internal diameter, a second portion 23 of intermediate internal diameter, and a third portion 24 of smaller internal diameter. The sleeve is located in the first portion 11 of the housing 10. The first portion 22 of the sleeve 17 carries a seal 25 sealingly received between the sleeve 17 and the first portion 11 of the housing 10. The first portion 22 of the sleeve 17 is of stepped external diameter and has a portion 26 spaced from the first portion 11 of the housing 10. The spaced portion 26 is provided with a passageway 27 connecting an inside wall 28 of the sleeve 17 to the inlet 20. The second portion 23 of the sleeve 17 is provided with a passageway 29 connecting the inside wall 28 of the sleeve to the outlet 21.

The hollow valve body 16 carries a seal 30 sealingly received between the valve body and the third portion 24 of the sleeve. A first end of the valve body in co-operation with the housing 10 defines a control spring chamber 31 in which is located a control spring 32 against which the valve body is moveable.

The first end of the valve body 16 is provided with an external annular groove 33. The annular groove 33 is connected by a passageway 34 with the control spring chamber 31. A dump control passage 35 in the third portion 24 of the sleeve provides communication between the outlet 21 and the annular groove 33. Specifically the passage 35 establishes permanent communication between the inlet 20 and the outlet 21.

A second opposing end of the valve body is provided with a valve head 36 forming a cage 37 slidably mounted in the first portion 22 of the sleeve. Normally the cage 37 is held against a seating 38 by the force of the control spring 32. The seating 38 is provided by an annular member 39 on the first portion 11 of the housing.

A recess 45 in the cage 37 accommodates a pressure sensitive member 46 defined by a non-deflectable plate 47 provided with an orifice 48. A spring 49 between the valve body 16 and the plate 47 urges the plate 47 towards a radial shoulder 50 extending inwardly from the cage 37.

The plate 47 has a circular crown 51 in which the orifice 48 of fixed diameter is located, and an edge region 52 which extends axially and radially to define an annular space 53 between the edge region 52 and the cage 37. A seal 55 housed in the space 53 provides a seal between the cage 37 and the plate 47.

The plate 47 is normally spaced from a seating 57 surrounding an opening 58 of small diameter in an adjacent part of the valve body 16. The plate 47 co-operates with the seating 57 to define an orifice of variable area.

In operation a pressure differential across the plate 47 causes it to move bodily with respect to the cage 37 and the seating 57. During such a movement the seal 55 provides compliance between the plate 47 and the cage 37 in addition to providing the seal therebetween, as described above.

The shoulder 50 is provided with a recess in which is located a plate 60. The plate 60 has a flow control maximum rise rate fixed orifice 59, and is provided with a filter 68 of domed outline to filter out impurities from fluid passing through the orifice 59. During bleeding of the valve, for instance when replacing the brake pads in a braking system the flow control orifice 59 controls the rise rate across the pressure sensitive member. During operation of the flow valve, however, the orifice 59 allows normal operational flow through the plate.

The valve body is also provided with a shoulder 41. A seal 42 of cup-shaped outline is located intermediate the shoulder 41 and the valve head 36. The seal 42 comprises a radial flange 43 and an axial flange 44. The seal 42 and a portion of the valve head with which it abuts are spaced from the inside wall 28 of the sleeve 17. The axial flange 44 is normally spaced from the seating 19 on the sleeve 17.

In an alternative embodiment the seal 42 may be formed integrally with the valve body.

The solenoid coil 14 is located in an annular recess in an end of the second housing portion 12. Normally the armature 15 is urged away from the solenoid 14 by means of a spring 61. In this position a valve head 62 carried by the armature engages with valve seating 63 to control communication between an exhaust 65 in the housing 12 and the interior of the valve body 16. The exhaust communicates with the expander chamber 6.

The master cylinder 1 is connected to the inlet 20 of the flow valve 4. In the normal inoperative position illustrated in the drawings, the inlet 20 is connected to the outlet 21. Fluid may flow along one of two paths. Firstly, fluid may flow from the inlet 20 to the outlet 21 via passageway 27, around valve head 36, around the seal 42 and the valve body 16 and out to the outlet 21 through passageway 29. Secondly, fluid may flow from the inlet 20 around the sleeve 17 past annular member 39 through the orifice 59' in the plate 60 and a corresponding orifice in the shoulder 50, through the orifice 48 in the pressure sensitive member 46, through opening 58 to the hollow interior of the valve body 16 and the control spring chamber 31, and then through passageway 34, annular groove 33, and dump control passage 35 to the outlet 21.

The operation of the invention during a single anti lock cycle will now be described.

When signals from the sensor 7 are recognised by the control unit 8 as indicative of an incipient skid condition, the control unit 8 energises the solenoid 14. This draws the armature 15 towards it to open the exhaust 65, placing the interior of the valve body 16 in communication with the expander chamber 6. This causes a pressure drop across the opening 58, which acts on the valve body 16 causing it to move relatively towards the armature 15 until the flange 44 seats against the seating 19. Movement of the valve body 16 is therefore arrested by this engagement with the seating 19, which significantly eliminates flow through the first flow path.

The operation of the invention during a single anti lock cycle will now be described.

Flow from the inlet to the outlet is, however, still possible via the second flow path. Communication between the brake 2 and the expander chamber 6 is through outlet 21, dump control passage 35, annular groove 33, passageway 34, control spring chamber 31 and exhaust 65. Thus, the brake 2 is connected to both the master cylinder 1 and the expander chamber 6 through dump control passage 35.

The control unit 8 also energises the motor 9, and the pump 5 withdraws fluid from the expander chamber 6 and pumps it back into the master cylinder circuit and through the fixed orifice 48 and the variable orifice 47,58. In this way circulation is matched to the output of the pump 5, preventing the piston in the master cylinder from bottoming out.

When the wheel recovers the control unit 8 de-energises the solenoid 14 which permits the exhaust 65 to close. Fluid withdrawn from the expander chamber 6 by the pump 5 and pumped back into the master cylinder circuit is then utilised to re-apply the brake 2 at a rate determined by flow through the fixed orifice 48 and the variable orifice 47,57.

As the pressure is built up, the excess pressure that previously led to a pressure spike in the control spring chamber, while still present, is absorbed into the larger combined volume of the control spring chamber and the brake.

When the pressure applied to the brake 2 is equal to the pressure developed by the master cylinder 1, the spring 32 moves the valve body 16 relatively away from the armature 15, in turn causing the flange 44 to move away from the seating 19 and fully connect this flow path from the master cylinder 1 to the brake 2.

In particular, it may be noted that operation of the present flow valve is controlled by the single valve body 16, rather than by a number of mutually slidable valve assembly components. Thus, the problem of concentricity of such prior art flow-valves is avoided.

The valve body 16 can be formed from a plastics material. This reduces the weight of the assembly. Such a component is also easier and cheaper to manufacture as no high precision machining is required. The other components of the valve assembly may also be of plastics.

Also, while the seal 30 is present to prevent communication between the valve body 16 and the sleeve 17, it has been found that if the seal 30 is omitted, provided the flow through this outlet is minimal, the operation of the flow valve is unaffected. In fact, it has been found that manufacturing the components within normal machining tolerances is sufficient to reduce the flow to an acceptable level.

We claim:

1. A solenoid-operated flow control valve comprising a housing having a bore, a solenoid coil, an armature, an inlet and an outlet, means defining a permanent communication between said inlet and said outlet, said means comprising a first and a second flow path connected in parallel between said inlet and said outlet, said first flow path being closable and said second flow path providing a variable permanent communication between said inlet and said outlet, an exhaust, a seating and a valve assembly including a hollow valve body working in said bore, said armature being responsive to said coil to open said exhaust to create a pressure differential across said valve body, said pressure differential in turn causing said valve body to move in said bore so as to co-operate with said seating, whereby said valve body provides selective communication between said inlet, outlet and exhaust, and whereby upon deenergisation of said coil said flow control valve controls the rate of reapplication of pressure to said outlet.

2. The valve according to claim 1, wherein said valve body comprises a first end provided with an annular groove and a passageway, a second end provided with a valve head, and an intermediate shoulder, a control spring chamber being defined by said first end in co-operation with said housing, and a cage being formed by said valve head.

3. The valve according to claim 2, wherein a seal is located intermediate said shoulder and said valve head of said valve body.

4. The valve according to claim 3, wherein said seal comprises a radial flange and an axial flange which engages said seating.

5. The valve according to claim 3 or claim 4, wherein said seal is formed integrally with said valve body.

6. The valve according to claim 1, wherein a master cylinder is connected to said inlet, a brake connected to said outlet, and an expander chamber connected to said exhaust, for operation in a vehicle anti-lock hydraulic system.

7. The valve according to claim 6, wherein under normal operation conditions, communication means are provided between said brake and said master cylinder via first and second flow paths, and said exhaust is closed, and, in response to a skid signal said solenoid coil is energised, opening said exhaust to place the interior of said valve body in communication with said expander chamber to produce said pressure differential across said valve body, in turn to cause said valve body to abut said seating so that communication between said brake and said master cylinder via said first flow path is significantly eliminated.

8. The valve according to claim 6 or claim 7, wherein on cessation of said skid signal, said solenoid coil de-energises, closing said exhaust and a pump withdraws fluid from said expander chamber and a pressure-sensitive member determines the rate at which said fluid is re-applied to said brake, until such time as the pressure applied to said brake is equal to that developed by said master cylinder whereupon said valve body moves back to its normal operating position re-establishing communication between said brake and said master cylinder via said first flow path.

9. The valve according to claim 8, wherein said pressure sensitive member comprises a plate provided with a circular crown in which an orifice of fixed diameter is located, and an edge region which extends axially and radially, an annular space being defined between said edge region and a cage, a seal being housed in said space to provide a seal between said cage and said plate.

10. The valve according to claim 9, wherein a seating surrounding an opening in an adjacent part of said valve body is normally spaced from said plate and an orifice of variable area is defined by co-operation of said plate with said seating, control of fluid flow being achieved via said variable orifice, and said fixed orifice.

11. A fluid flow valve according to claim 8 incorporating said pressure sensitive member across which said pressure differential is determined, wherein a plate is provided in said flow-control valve to control maximum pressure rise rate across said pressure sensitive member during bleeding of said flow control valve.

12. The valve according to claim 11, wherein a flow control maximum rise rate fixed orifice provided in said plate controls the build up of operating force across said pressure sensitive member.

13. The valve according to claim 1, wherein said valve assembly includes a sleeve, and said hollow body works in said sleeve.

14. The valve according to claim 13, wherein said sleeve comprises a first portion of stepped diameter provided with a seal and a passageway which connects the inside wall of said sleeve to said inlet, a second portion provided with a passageway which connects said inside wall of said sleeve to said outlet, and a third portion provided with a dump control passage which connects said outlet to an annular groove.

15. The valve according to claim 1, wherein said means defining permanent communication between said inlet and said outlet includes said valve body.

16. The valve according to claim 1, wherein a control spring holds said valve body in a normal operating position, in which position communication is provided between said inlet and said outlet via said first flow path without passing through said valve body.

17. The valve according to claim 1, wherein said valve body is urged into engagement with said seating in response to said pressure differential, to eliminate flow between said inlet and said outlet through said first flow path.

* * * * *